US012002179B2

(12) United States Patent
Palacios et al.

(10) Patent No.: US 12,002,179 B2
(45) Date of Patent: Jun. 4, 2024

(54) AUGMENTED IMAGE ADJUSTMENT OF USER BASED ON POSSIBLE ACTIONS OR NON-ACTIONS

(71) Applicant: Sony Interactive Entertainment Inc., Tokyo (JP)

(72) Inventors: Jorge Arroyo Palacios, San Mateo, CA (US); Todd Tokubo, San Mateo, CA (US)

(73) Assignee: Sony Interactive Entertainment Inc., Tokyo (JP)

(*) Notice: Subject to any disclaimer, the term of this patent is extended or adjusted under 35 U.S.C. 154(b) by 286 days.

(21) Appl. No.: 17/497,712

(22) Filed: Oct. 8, 2021

(65) Prior Publication Data

US 2023/0115716 A1 Apr. 13, 2023

(51) Int. Cl.
*G06T 19/20* (2011.01)
*A63B 24/00* (2006.01)
*A63B 71/06* (2006.01)
*G06T 17/20* (2006.01)
*G06T 19/00* (2011.01)
*G06V 20/20* (2022.01)
*G06V 40/10* (2022.01)
*G06V 40/20* (2022.01)

(52) U.S. Cl.
CPC .......... *G06T 19/20* (2013.01); *A63B 24/0006* (2013.01); *A63B 71/0622* (2013.01); *G06T 17/20* (2013.01); *G06T 19/006* (2013.01); *G06V 20/20* (2022.01); *G06V 40/103* (2022.01); *G06V 40/23* (2022.01); *A63B 2071/0636* (2013.01); *G06T 2219/2021* (2013.01)

(58) Field of Classification Search
CPC ....... G06T 19/20; G06T 17/20; G06T 19/006; G06T 2219/2021; G06V 20/20; G06V 40/103; G06V 40/23; A63B 24/0006; A63B 71/0622; A63B 2071/0636
See application file for complete search history.

(56) References Cited

U.S. PATENT DOCUMENTS

| | | | |
|---|---|---|---|
| 2018/0253840 A1* | 9/2018 | Tran | G16H 40/63 |
| 2019/0035149 A1* | 1/2019 | Chen | G06V 40/166 |
| 2019/0122424 A1* | 4/2019 | Moore | G06T 7/62 |
| 2020/0319015 A1* | 10/2020 | Kamiyama | G01G 19/50 |
| 2021/0304865 A1* | 9/2021 | Kim | A61B 5/7278 |
| 2022/0023718 A1* | 1/2022 | Augustin | G06N 3/08 |
| 2022/0258049 A1* | 8/2022 | Kanani | G06Q 30/0621 |
| 2023/0096013 A1* | 3/2023 | Agrawal | G06T 7/60 345/423 |

* cited by examiner

Primary Examiner — Antonio A Caschera
(74) Attorney, Agent, or Firm — Penilla IP, APC

(57) ABSTRACT

Methods and systems describe augmenting image content presented on a mirror display. The method includes detecting images of a user in an activity volume in front of the mirror display; the detecting includes identifying a body of the user and tracking movements by the user while in the activity volume. The method includes receiving a request to predict a change in physique of the body of the user, the request includes input parameters that identify a physical exercise and an amount of said physical exercise. The method includes generating an augmented image of the body of the user; the augmented image of the body has said change in physique, the change in physique of the body is assembled from one or more three-dimensional (3D) models of one or more body parts of the body that have been adjusted in shape.

18 Claims, 7 Drawing Sheets

Physical Activity & Caloric Consumption Tracker — 302

| | Week 1 | Week 2 | Week 3 | Week 4 | Week N |
|---|---|---|---|---|---|
| Calorie Consumption | | | | | |
| Monday | 1848 calories | 1732 calories | 1839 calories | 1818 calories | 1635 calories |
| Tuesday | 1563 calories | 1350 calories | 1830 calories | 1724 calories | 1493 calories |
| Wednesday | 1604 calories | 1839 calories | 1759 calories | 2004 calories | 1794 calories |
| Thursday | 1734 calories | 1836 calories | 1786 calories | 1609 calories | 1874 calories |
| Friday | 2396 calories | 2480 calories | 2684 calories | 2342 calories | 2502 calories |
| Saturday | 1333 calories | 1438 calories | 1694 calories | 1726 calories | 1603 calories |
| Sunday | 1445 calories | 1345 calories | 1345 calories | 1345 calories | 1345 calories |
| Workout Regimen | | | | | |
| Monday | Workout 4 | Workout 5 | Workout 4 | Workout 2 | Workout 4 |
| Tuesday | Workout 8 | Workout 2 | Workout 8 | Day Off | Workout 8 |
| Wednesday | Workout 2 | Workout 22 | Workout 16 | Workout 4 | Workout 2 |
| Thursday | Day Off | Workout 13 | Day Off | Workout 8 | Day Off |
| Friday | Day Off | Workout 13 | Workout 15 | Day Off | Day Off |
| Saturday | Workout 10 | Day Off | Day Off | Workout 4 | Workout 10 |
| Sunday | Workout 12 | Workout 13 | Day Off | | Workout 12 |

304 — Calorie Consumption
306 — Workout Regimen

FIG. 3

Total Body Composition Metrics

| Body Region | Region Fat % | Total Mass (LBS) | Fat (LBS) | Lean Muscle (LBS) | Bone Mineral Content |
|---|---|---|---|---|---|
| Arms | 31.23 | 26.90 | 8.40 | 18.50 | 1.10 |
| Shoulders | 8.50 | 16.00 | 1.36 | 14.64 | 0.98 |
| Chest | 35.65 | 33.10 | 11.80 | 21.30 | 1.50 |
| Abs | 45.03 | 15.10 | 6.80 | 8.30 | 0.10 |
| Legs | 29.94 | 62.80 | 18.80 | 44.00 | 2.60 |
| Glutes | 40.50 | 32.00 | 12.96 | 19.04 | 2.50 |
| Back | 42.27 | 38.80 | 16.40 | 22.40 | 2.20 |
| Total | 34.05 | 224.7 | 76.52 | 148.18 | 10.98 |

FIG. 4

AUGMENTED IMAGE ADJUSTMENT OF USER BASED ON POSSIBLE ACTIONS OR NON-ACTIONS

BACKGROUND

1. Field of the Disclosure

The present disclosure relates generally to augmenting image content, and more particularly to methods and systems for generating an augmented image of a body of a user for presenting on a mirror display.

2. Description of the Related Art

The fitness technology industry is continuously evolving and growing at an unprecedented rate. Each year, gyms and fitness clubs are offering the latest fitness technologies in their facilities to stay up to date with competitors. Further, fitness technologies are also finding a place within people's home environment to alleviate the burden of travelling to their local gym and having to wait their turn to use specific gym equipment. With the rise in popularity of fitness technologies, people are seeking ways to incorporate fitness related technology into their daily lives in order to help them efficiently and effectively achieve their fitness goals. Some of the current fitness industry technology trends include, for example, wearable technology, smart fitness equipment, live streaming classes, virtual reality, fitness applications, etc.

For example, smart fitness equipment such as the Peloton™ bikes and treadmills have risen in popularity over the years. Smart fitness equipment can offer the experience of working out in a gym studio in a group environment from the comfort of a user's home environment while being guided by a fitness instructor. In another example, a growing trend is to use of wearable technology (e.g., fitness trackers) which can be used to monitor the overall health of the user by tracking the user's heart rate, sleep patterns, activity level, etc. Unfortunately, some users who are driven by instant results and gratification may find that current fitness technologies are unable to motivate and encourage users to continue adhering to their fitness activities so that they can reach their fitness goals.

It is in this context that implementations of the disclosure arise.

SUMMARY

Implementations of the present disclosure include methods, systems, and devices relating to augmenting image content for presenting on a mirror display. In some embodiments, methods are disclosed to enable generating an augmented image of the body of the user wherein the augmented image of the body of the user has a change in physique. For example, a user who is on a fitness and diet regimen has been working out for five consecutive days where the changes to the body of the user is unnoticeable. While standing in front of a mirror display, the user provides a verbal request to predict the change in the user's physique if the user were to continue (or not continue) with their fitness and diet regimen for another 10 consecutive days, e.g., "Hey Sony, what would my physique look like if I continue my current workout for another twenty days?" In response to the request by the user, the system is configured to generate in substantial real-time, an augmented image of the body of the user for display on the mirror display. In one embodiment, the generated augmented image of the body of the user includes a change in physique of the body that is assembled from three-dimensional (3D) models that correspond the body parts of the user which that have been adjusted in shape or size.

In one embodiment, the augmented image of the body of the user includes a change in physique of the user, and the methods disclosed herein outline ways of augmenting the appearance of the user's body so that the user can have a projected image of what the physique of the user may look like at a specific point in the future if the user continues to or fails to exercise or diet. In this way, the user may be encouraged to work toward their fitness goals by continuing to adhere to their physical exercise routine, intensity of their exercise routine, and their dietary program since the user is provided with a projected image of what their physique may look like in the future. It is believed that presenting the user with a projected augmented image of the physique of the user may motivate the user to continue with their fitness routine and dietary program as well as promoting a healthy lifestyle.

Thus, as a user continues with their physical exercise routine to attain their fitness goals, the user can submit a query to the system to generate an augmented image of their body which includes a change in physique of their body at any point in time. In some embodiments, the augmented image can be generated in real-time using template and machine learning to identify best fit scenarios, and the augmented image may include partial adjustments to different parts of the body or attributes of the body of the user. In one embodiment, the mirror display can provide the user with dynamic feedback during a workout by showing where fitness results will occur if the user continues to do or fails to do a certain exercise. In other embodiments, the mirror display may present the physique of the user which can be augmented to show added body fat or loss in muscle mass if the user continues to miss exercise days, fails to exercise, or consume an unhealthy diet. In this way, users who may be on the verge of giving up with their physical exercise routine or their healthy dietary plan may be motivated to continue to work toward their fitness goals if they are provided with an augmented image of what their physique may look like.

In one embodiment, a method for augmenting image content presented on a mirror display is provided. The method includes detecting images of a user in an activity volume in front of the mirror display; the detecting includes identifying a body of the user and tracking movements by the user while in the activity volume. The method includes receiving a request to predict a change in physique of the body of the user, the request includes input parameters that identify a physical exercise and an amount of said physical exercise. The method includes generating an augmented image of the body of the user; the augmented image of the body has said change in physique, the change in physique of the body is assembled from one or more three-dimensional (3D) models of one or more body parts of the body that have been adjusted in shape. The method includes presenting, on the mirror display, the augmented image of the body of the user as a video overlay over images of the user captured when the user is in the activity volume; the presenting is responsive to processing said request to predict the change in physique of the body of the user. In this way, when a user is provided with an augmented image of what the body of the user may look like at a specific point in the future, the user may be encouraged to continue with their physical fitness regimen and dietary program so that the user can achieve their fitness goals.

In another embodiment, a method for augmenting image content presented on a mirror display is provided. The method includes capturing images of an activity volume disposed proximate to a front of the mirror display. The method includes detecting a user in the activity volume; the detecting includes identifying a body of the user and tracking movements by the user while in the activity volume. The method includes receiving a request to predict a change in physique of the body of the user, the request includes input parameters that identify a physical exercise and an amount of said physical exercise. The method includes processing images of the body of the user while in the activity volume; the processing includes generating a mesh outline of one or more body parts of the user and adjusting a shape of the mesh outline to generate three-dimensional (3D) models of said body parts. The method includes generating an augmented image of the body of the user; the augmented image of the body has said change in physique, the change in physique of the body is assembled from one or more 3D models of said body parts that have been adjusted in shape. In one embodiment, the augmented image of the body of the user is presented as a video overlay over images of the user captured when the user is in the activity volume, the presenting is on the mirror display.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure may be better understood by reference to the following description taken in conjunction with the accompanying drawings in which:

FIG. 3 illustrates an embodiment of a physical activity and caloric consumption tracker of a user, in accordance with an implementation of the disclosure.

FIG. 4 is an embodiment of a total body composition summary of a user, in accordance with an implementation of the disclosure.

DETAILED DESCRIPTION

Figure 1:
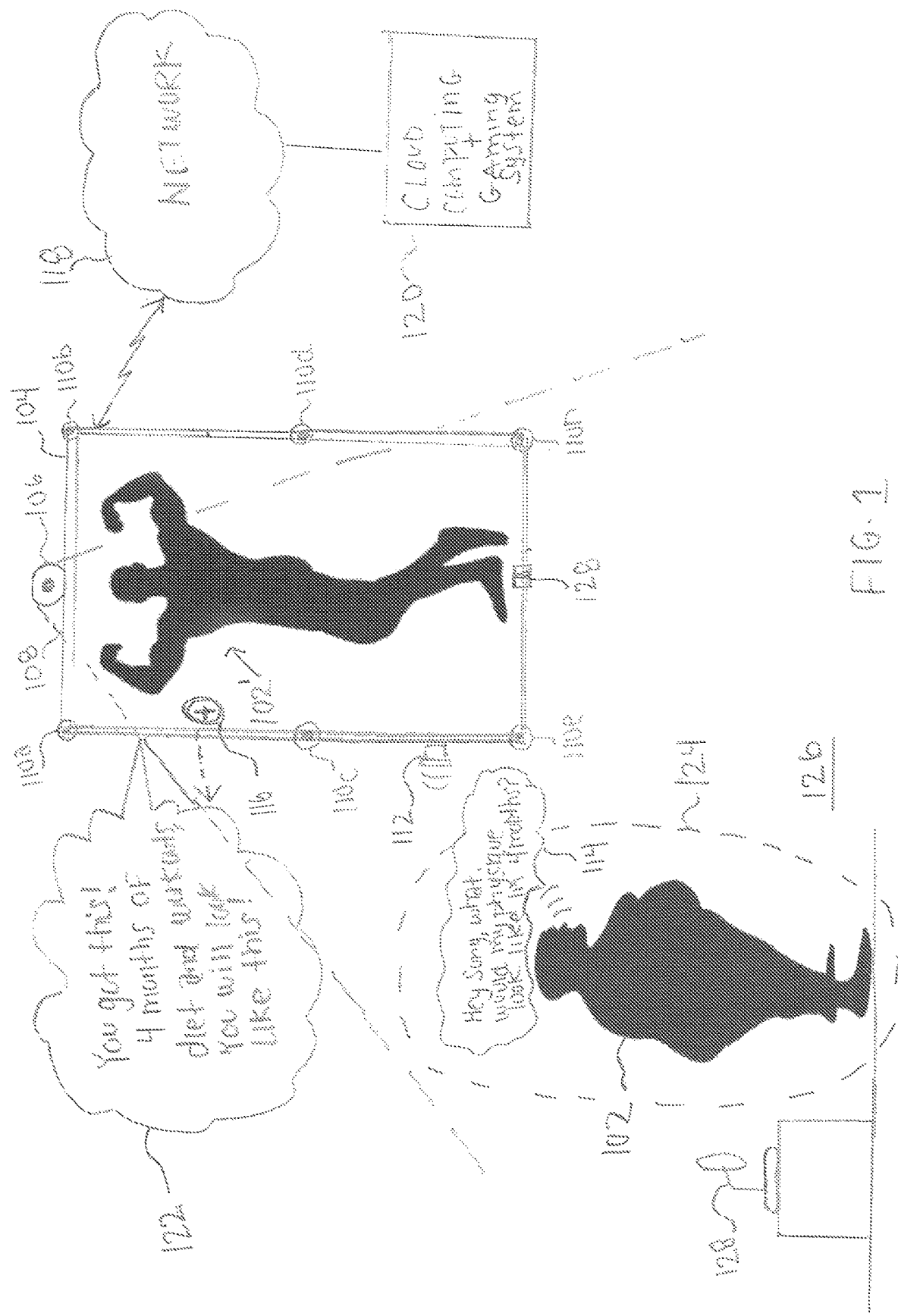
FIG. 1 illustrates an embodiment of a system that is configured to identify a user in front of a mirror display and to generate an augmented image of the body of the user for display to the user via the mirror display, in accordance with an implementation of the disclosure.

The following implementations of the present disclosure provide methods, systems, and devices for augmenting image content for presenting on a mirror display where the augmented image content includes an image of the body of a user. In one embodiment, the augmented image of the body of the user includes a change in physique of the body of the user which provides the user with a projected view of what the user's body may look like at a point in the future. In one embodiment, the change in physique of the body of the user is assembled from one or more three-dimensional (3D) models that correspond to the body parts of the user that have been adjusted in shape.

For example, while a user is exercising in an activity volume that is proximate to a mirror display, the system is configured to identify the body of the user and track the user's movement during the user's exercise routine. In one embodiment, depth sensing cameras can be used to detect volume, contours and shapes of the user's body. In some embodiments, machine learning is used to predict or appreciate the current contours and shapes of the user's body in case of occlusion or when movement of the user is too rapid. In one embodiment, at any point during the exercise routine, the user may submit a request for the system to predict a change in physique of the body of the user based on a specific type of physical exercise and number of repetitions of the physical exercise. In response to the request by the user, the system can dynamically generate an augmented image of the body of the user to make the physique of the user appear slimmer or more muscular. Accordingly, as the user submits a request to predict a change in physique based on a specific set of parameters such as a specific exercise routine, exercise type, dietary program, etc. the system is configured to generate in substantial-real time an augmented image of the physique of the user. This may provide an effective way to encourage users to continue exercising and eating a healthy diet since the users are provided with an augmented image of what their physique may look like if they continue to adhere to their exercise and diet routine. In turn, this can enhance the fitness journey for users who may want to quickly find out what their physique may look like at a specific point in the future. Further, this may allow the user to make changes in their exercise routine or dietary program if they know in advance what their physique may look like.

By way of example, in one embodiment, a method is disclosed that enables augmenting image content for presenting on a mirror display. The method includes detecting images of a user in an activity volume in front of the mirror display. In one example, the detecting includes identifying a body of the user and tracking movements by the user while in the activity volume. In one embodiment, the method may further include receiving a request to predict a change in physique of the body of the user, the request includes input parameters that identify a physical exercise and an amount of the physical exercise. For example, the input parameters may be via natural language where a user verbally expresses a request to predict (e.g., Hey Sony, how will my physique look in two months if I keep doing 100 burpees and 100 sit-ups every day?). In another embodiment, the method may include generating an augmented image of the body of the user. In one example, the augmented image of the body includes a change in physique, the change in physique of the body is assembled from one or 3D models or graphic meshes of one or more body parts of the body that have been adjusted in shape. In another embodiment, the method may include presenting, on the mirror display, the augmented image of the body of the user as a video overlay over images of the user captured when the user is in the activity volume. In one embodiment, the presenting is responsive to processing said request to predict the change in physique of the body of the user. It will be obvious, however, to one skilled in the art that the present disclosure may be practiced without some or all of the specific details presently described. In other instances, well known process operations have not been described in detail in order not to unnecessarily obscure the present disclosure.

In accordance with one embodiment, a system is disclosed for augmenting image content and presenting the augmenting image content on a mirror display. In one example, the augmented image content can include an augmented image of the body of a user. For example, a user may be exercising at their home in front of a mirror display where the mirror display is configured to present image content and media content that is generated by a cloud computing and gaming system. While viewing the content and exercising in front of the mirror display, the system is configured to detect the body of a user, track the movements of the user, and identify a request by the user to predict a change in physique of the user's body.

In some embodiments, the mirror display includes one or more integrated cameras. The mirror display may also be a display that functions as a real mirror but also functions as a display for dynamically augmenting image data captured by the one or more cameras. In some configurations, the mirror display maybe have its own internal computer system and network connection. In other configurations, one or more computer parts and/or network circuitry may be plugged into the mirror display (e.g., a dongle) using a connector, e.g., USB, HDMI, etc.

In one embodiment, when the system receives a request from the user to predict a change in physique of the body of the user, the cloud computing and gaming system is configured to dynamically generate an augmented image of the body of the user which includes a predicted change in the physique of the user's body. In one embodiment, the change in physique of the body of the user is assembled from 3D models that correspond to the body parts of the user. The 3D models can be adjusted in size and shape using various templates and a model to determine the corresponding sizes of the 3D models. For example, the system may increase or decrease the size and shape of a 3D model representing the legs and arms of a user by a magnitude which can be used for assembling the change in physique of the user. In another example, if the physical exercise routine of a user includes a significant volume of heavy barbell squats and other lower body exercises, the 3D model of the legs of the user may be adjusted in size in shape to show more muscle mass, greater muscle definition, greater girth, a lower body fat percentage compared to the current size and shape of the legs of the user. In some embodiments, the 3D models of the body parts of the user can been adjusted in size and shape where the size and shape are selected based on a model. In some embodiments, the model may be able to receive as inputs a profile of the user, user captured actions, and user request data. In other embodiments, based on the noted inputs, the model can be used to generate an augmented image of the body of the user at a specific point in the future. In this way, users are provided with a preview of what the physique may look like if the user continues working out a certain way or adhering to specific type of diet.

In one embodiment, the mirror display can provide the user with dynamic feedback during a workout, showing where fitness results will occur if the user continues to do a certain exercise. For example, while the user is doing push-ups, the mirror display can provide feedback to the user by prompting the user to adjust their form while performing the push-ups or to complete additional repetitions in order to reach their desired fitness goals. In other embodiments, feedback to the user may be accolades or words of affirmations that inform the user that they are doing a good job.

In other embodiments, the mirror display can be configured to augment the physique of the user to add body fat if the user continues to miss exercise days or fails to exercise. For example, the augmenting of the user's physique can dynamically make the user look heavier or unhealthy, and the system can provide a feedback warning and a generate an augmented image of what the user may look like if certain exercise routines, exercise methods, nutrition, or days that are missed. The user looking at him or herself in the mirror display will see the potential for working out, by showing the weight gain already on the user, thus encouraging the user to continue to work out. In some embodiments, the context of providing AR augmentation of the user is also useful for providing motivation to continue to work out or see the results that will occur. Often times, users are not motivated to continue working out when the results are not evident or hard to see on the day-by-day basis. In this way, when a user can visualize what the physique of the user may look like if the user performs or does not perform specific actions, the user may be motivated and encouraged by the possible outcome of their actions and non-actions.

With the above overview in mind, the following provides several example figures to facilitate understanding of the example embodiments.

FIG. 1 illustrates an embodiment of a system that is configured to identify a user 102 in front of a mirror display 104 and to generate an augmented image of the body of the user for display to the user via the mirror display 104. As shown in the illustrated implementation, the mirror display 104 is wirelessly connected to a cloud computing and gaming system 120 over a network 118. In one example, the user 102 may be standing in front of the mirror display 104 viewing various content such as augmented images, video games, movies, sports, music, live TV, etc. In some embodiments, the user 102 may submit a request to predict a change in physique of the body of the user. In response to the request by the user, the cloud computing and gaming system 120 is configured to process the request and dynamically generate an augmented image of the body of the user which can be viewed on the mirror display 104. In other embodiments, the generated augmented images can be presented on the mirror display 104 or can be viewed through a display of a device such as an augmented reality (AR) head mounted display (HMD), a mobile phone, a laptop, a tablet computer, a monitor and console/PC setup, a television, etc. In some embodiments, augmented images and media content presented on the mirror display 104 can be shared with spectators that are connected over the network 118 so that others that are located in a remote location can view what is being presented on the mirror display 104.

As illustrated in FIG. 1, a user 102 is shown in an activity volume 124 standing in front of the mirror display 104. In one embodiment, the activity volume 124 may be proximate to the mirror display 104 where the user 102 can stand and view media content and various augmented images that are presented on the mirror display 104. In one example, the media content may include instructor led activities such as exercise classes, yoga classes, martial arts classes, dancing classes, etc. While the user 102 is standing within the activity volume 124 and performing the various actions and movements provided by media content, a camera 106 and a plurality of depth sensors 110 of the mirror display 104 are configured to capture images of the user's body in the activity volume 124 and track the movements of the user 102. In one configuration, multiple cameras 106 may be provided around the border of the mirror display 104 or may be disposed behind the mirror display looking at the user 102.

The multiple cameras 106 may themselves be depth sensing cameras, and multiple cameras 106 can be used to track motion of the user 102 from multiple angles to improve approximation of the user's body shape, contours, skin firmness, tone, and the like. In some configurations, machine learning is used to take as input the multiple image streams from the cameras 106 and/or depth sensors 110*a*-110*f*. The images, in one embodiment, are parsed to identify image features that are classified and processed by a model. The model is then used to predict and appreciate the current body of the user and then provide augmentation of one or more body parts for display in the mirror.

In one configuration, the mirror display 104 will appear as a mirror to the user, such that other things and items in the user's space will be shown (i.e., as captured by the cameras). To the user, the mirror display 104 will mostly function as a mirror. However, when augmentation is done, the display of the user or parts of the user will be adjusted with overlay graphics to change the appearance of the user's body, clothes over the body, and the like. The overlay graphics will cover-up the real-world view of the user's body and/or clothes and present a seamless overlay of the modified or augmented view. To the user, the augmentation will appear real, since the other content on the mirror display 104 will be of the user's room (e.g., the user's living room, and pet and the like).

In some embodiments, the mirror display 104 may include a camera 106 with a camera point of view (POV) 108 that is configured to capture images of objects that may be located in the real-world space 126 of the user 102 such as a user 102 in the activity volume 124. In some embodiments, the images captured by the camera 106 can be analyzed to identify the body of the user 102. In some embodiments, the camera 106 may be configured to capture and process the body movements of the user 102 during the user's interaction with the content that is presented on the mirror display 104. For example, the user 102 may be viewing a live or pre-recorded bootcamp fitness class led by a fitness instructor. While performing various exercise movements such as burpees, pushups, jumping jacks, etc., the user may end up moving around in various angles and directions and end up in a different position than where the user had initially started. Accordingly, in one embodiment, the camera 106 may be mounted on a 3-axis gimbal that allows the camera to rotate freely about any axis to enable the capturing of various angles of the user. In other embodiments, the camera 106 may be a pan-tilt-zoom camera which can be configured to automatically zoom in and track the user's face and various body parts of the user as the user moves during the physical activity.

In some embodiments, the mirror display 104 may include a plurality of depth sensors 110*a*-110*n* that are configured for capturing depth data and texture data for creating 3D models of the objects captured within its corresponding POV. In some embodiments, the depth sensors 110*a*-110*n* can provide both color and dense depth images which can facilitate 3D mapping of the captured images. For example, the depth sensors 110*a*-110*n* can be used to capture 3D depth data and to perform 3D mapping of the various body parts (e.g., arms, legs, abdominals, etc.) of the user to create 3D models that are used to assemble the physique of the user. In some embodiments, the 3D model of the body parts of the user can be adjusted in shape and size to produce an augmented image of the user's body.

In some embodiments, the mirror display 104 can include one or more microphones 128 that is configured capture sound from the real-world space 126 where the mirror display 104 is located. In other embodiments, the microphones 128 can be placed anywhere in the real-world space for capturing the sound produced by the user and others in the real-world space. The sound captured by the microphone may be processed to identify the location of a sound source. Sound from an identified location can be selectively utilized or processed to the exclusion of other sounds not from the identified location. This information can be utilized in various ways, including exclusion of unwanted sound sources, association of a sound source with a visual identification, etc. For example, as shown in FIG. 1, a voice output 114 of a user 102 may be a request to predict a change in physique of the body of the user (e.g., what would my physique look like in four months?). The microphones 128 are configured to capture the voice output of the user for processing and analyzing to generate an augmented image of the body of the user.

In other embodiments, when a user submits a request to the system to predict a change in physique of the body of the user, the request may include various input parameters such as physical exercise type, volume and intensity of the physical exercise, dietary type, caloric consumption, macronutrient consumption, micronutrient consumption, water consumption, etc. For example, a user may submit a request to the system to predict what the physique of the user may look like in 20 weeks if the user's physical exercise includes boxing four times a week and if the user adheres to a paleo diet.

Based on the noted inputs, the system may use a machine learning model which can be used to predict and generate an augmented image of the body of the user which includes the change in physique of the body. In other embodiments, if the user is unsatisfied with the appearance of the predicted physique, the user can adjust the input parameters (e.g., boxing 3 times a week, lifting weights twice per week, and keto diet) and resubmit their request to the system for an updated view of the augmented image of the body. In this way, users may be encouraged and more motivated to continue working toward their fitness goals when they are provided with a visual of their physique especially when the results are not evident or when it is hard to see their progression on a day-by-day basis.

In some embodiments, in response to a request by a user 102, the system is configured to generate an avatar 102' that represents the user at a specific point in the future. As noted above, when a user submits a request to predict a change in physique of the body of the user (e.g., what would my physique look like in four months?), the system can dynamically generate an avatar 102' of the user which includes an augmented image of the body of the user. For example, as illustrated on the mirror display 104, the avatar 102' of the user 102 includes various body parts that have been augmented to represent what the physique of the user may look like if the user continues with his physical activity and diet plan for the next four months. As shown, the avatar 102' of the user includes a change in physique that appears to be healthier and in better shape than the user 102. The avatar 102' of the user is shown having augmented arms, augmented shoulders, augmented chest, augmented abdominals, augmented legs, etc. that has less body fat and has greater muscular definition compared to the body of the user 102.

In some embodiments, the change in physique of the body of the user 100 is assembled from three-dimensional (3D) models that correspond to the body parts of the user. As noted above, the depth sensors 110a-110n can be used to detect depth data associated with the various body parts of the user which can be used for creating a 3D models for the body parts. In some embodiments, the depth data can be used to generate a wire frame model and mesh outline of each body part of the user to generate the 3D models for the body parts. In some embodiments, the mesh outline of each body part can be adjusted in shape or size to generate the corresponding 3D models. For example, the system may increase or decrease the size and shape of a mesh outline representing the arms and chest of a user by a magnitude which can be used for generating the 3D models which are used for assembling the change in physique of the user. In one example, if the physical exercise routine of the user includes a significant volume of upper body excises (e.g., bench press, bicep curls, etc.), the mesh outline corresponding to the arms and chest of the user may be adjusted in size in shape to show greater muscle mass, greater muscle definition, greater girth, a lower body fat percentage compared to the present state of the chest and arms of the user.

In some embodiments, the generated augmented image of the body of the user 102 can be presented on the mirror display 104. In one embodiment, the augmented image is presented as a video overlay over images of the user 102 captured when the user 102 is in the activity volume 124. For example, a user 102 may be standing in the activity volume 124 and submit a request to the system to predict what the abdominals of the user 102 may look like after adhering to a program that includes a series of abdominal exercises and a ketogenic diet for the next 10 weeks. In response to the request, an augmented image of the abdominals of the user is presented as video overlay over the captured images of the abdominals of the user when the user was standing in the activity volume 124. In some embodiments, as the user moves and changes positions to view the augmented images of the abdominals from different angles, the video overlay of the augmented image of the abdominals can move along with the movements of the user so that the video overlay appears integrated with the body of the user.

In one embodiment, the system is configured to generate a notification icon 116 which can be presented on the mirror display 104. In some embodiments, the notification icon 116 may include a notification message 122 that includes a feedback warning informing the user of a certain look that the user will take on if certain exercising routines, methods, or days are missed. In some embodiments, after the user clicks on the notification icon 116 or provides a voice prompt to select the notification icon 116, the corresponding notification message 122 may appear on the mirror display. In other embodiments, the notification message 122 can appear on the mirror display without the user clicking on the notification message 122. For example, if the user is eating an unhealthy diet, missing consecutive workouts throughout the week, and the intensity of the workout has decreased, the notification message 122 may automatically appear on the mirror display and include a feedback warning message informing the user that it will put on body fat and gain a certain amount of weight.

In other embodiments, the notification message 122 can be automatically generated and displayed on the mirror display 104 to provide the user with information related to the generated augmented image. For example, referring to the notification message 122 shown in FIG. 1, the notification message 122 includes the message stating, "You got this! 4 months of diet and workouts, you will look like this!" In the illustrated example, the notification message 122 is in response to a request by the user (e.g., Hey Sony, what would my physique look like in 4 months?) which is automatically generated by the system to provide the user with information related to the generated augmented image.

In some embodiments, the mirror display 104 may include one or more speakers 112 located at various positions along the mirror display. In one embodiment, the mirror display 104 may generate an audio playback of the notification message 122 via the one or more speakers 112 to transcribe the contents of the notification message. For example, while the user 102 is exercising in the activity volume in front of the mirror display, based on tracking the movements of the user, the system may determine that the user's intensity is decreasing and that the user is struggling to finish the workout. Accordingly, the system may generate a notification message 122 that includes words of encouragement to motivate the user to continue with the workout and to not give up, e.g., you can do this, don't give up, only 5 more minutes to go, etc.

In the illustrated implementation shown in FIG. 1, the mirror display 104 is wirelessly connected to a cloud computing and gaming system 120 over a network 118. In one embodiment, the cloud computing and gaming system 120 maintains and executes the augmented images, media content, and video games which can be presented on the mirror display 104. In some embodiments, the cloud computing and gaming system 120 is configured to receive inputs from the mirror display 104 over the network 118. The cloud computing and gaming system 120 is configured to process the inputs from the user to affect the state of the augmented images. The output from the executing augmented images such as the change in physique of the user is transmitted to the mirror display 104. In other implementations, the mirror display 104 may communicate with the cloud computing and gaming system 120 wirelessly through alternative mechanisms or channels such as a cellular network.

Figure 2:
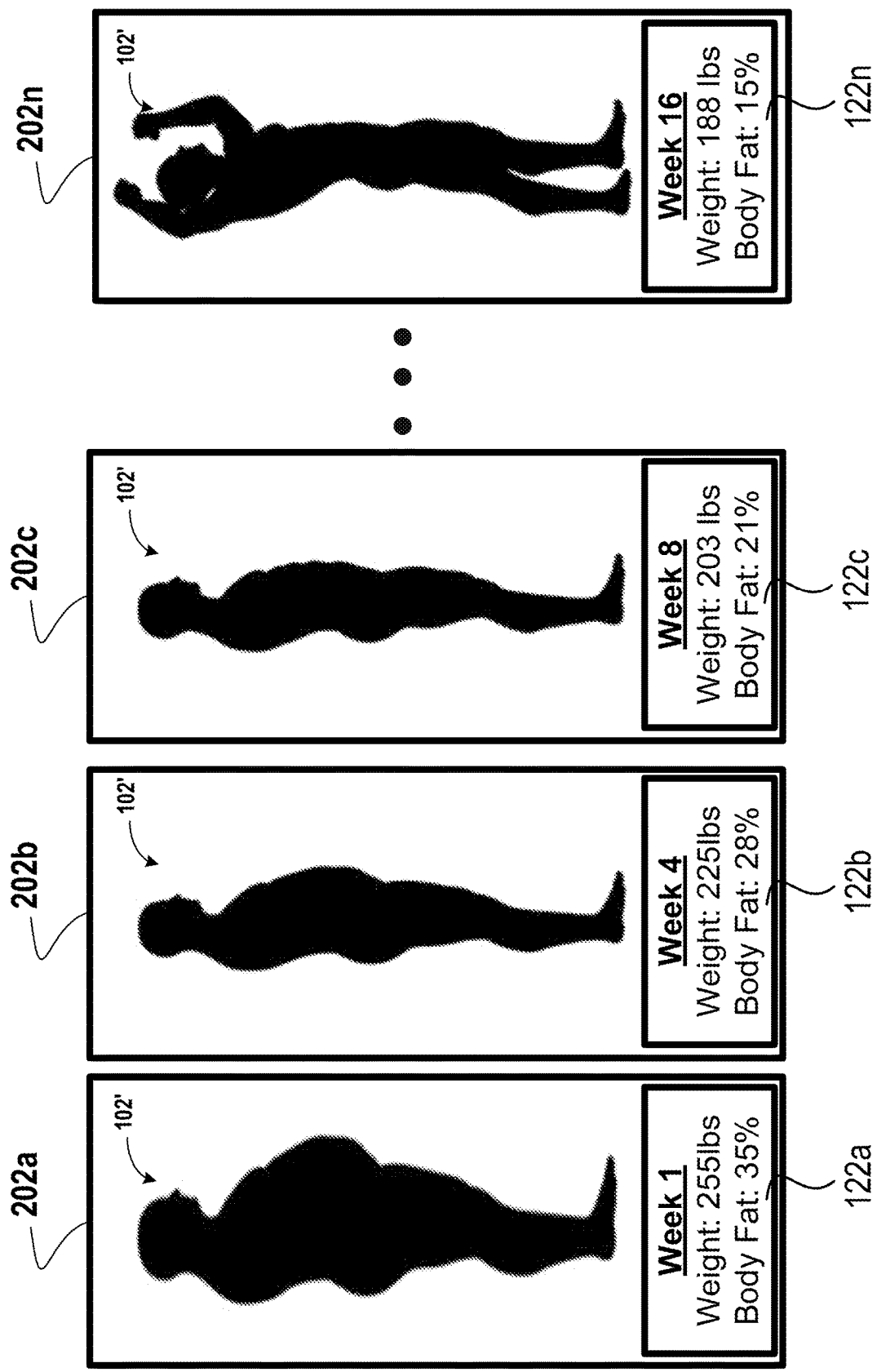
FIG. 2 illustrates various embodiments of augmented images of the body of a user that are generated in response to a request by the user to predict a change in physique of the body of the user, in accordance with an implementation of the disclosure.

FIG. 2 illustrates various embodiments of augmented images 202a-202n of the body of a user 102 that are generated in response to a request by the user 102 to predict a change in physique of the body of the user 102. For example, referring to FIG. 2, in response to a request by a user 102 to predict what the physique of the user would look like in week 1, week 4, week 8, and week 16, the system is configured to generate an avatar 102' that represents the user at the desired point in time as requested by the user. As illustrated, in one example, augmented image 202a shows an avatar 102' of the user with a predicted change in physique after week 1. The augmented image 202a also includes a corresponding notification message 122a that provides information related to the generated augmented image 202a. In particular, the notification message 122a indicates that after week 1, the physique of the user is predicted to have a body weight of 255 lbs. with 35% body fat.

In another example, augmented image 202b shows an avatar 102' of the user with a predicted change in physique after week 4. The augmented image 202b also includes a corresponding notification message 122b which indicates that after week 4, the physique of the user is predicted to have a body weight of 225 lbs. with 28% body fat. In yet another example, augmented image 202c shows an avatar 102' of the user with a predicted change in physique after week 8. The augmented image 202c also includes a corresponding notification message 122c which indicates that after week 8, the physique of the user is predicted to have a body weight of 203 lbs. with 21% body fat. In another example, augmented image 202n shows an avatar 102' of the user with a predicted change in physique after week 16. The augmented image 202n also includes a corresponding notification message 122n which indicates that after week 16, the physique of the user is predicted to have a body weight of 188 lbs. with 15% body fat.

In some embodiments, the augmented images 202a-202n of the body of a user 102 are assembled using various 3D models. An Artificial Intelligence (AI) model may use a machine learning model to generate the augmented image of the body of the user by identifying and selecting 3D models of the body parts of the user that are adjusted in size and shape. For example, referring to FIG. 2, the AI model may use a different 3D model of the abdominals of the user to generate the change in physique of the user at week 1 than week 8 since the abdominals have a different shape and size during their respective time period.

FIG. 3 illustrates an embodiment of a physical activity and caloric consumption tracker 302 of a user 102. In one embodiment, the physical activity and caloric consumption tracker 302 can be used as input parameters when a user requests the system to predict a change in physique of the body of the user. As noted above, when a user 102 submits a request to the system to predict a change in physique of the body of the user, the request may include various input parameters such as physical exercise type, volume and intensity of physical exercise, dietary type, caloric consumption, macronutrient consumption, micronutrient consumption, water consumption, etc. For example, as illustrated in in FIG. 3, the table includes a summary of the caloric consumption 304 that the user plans to consume for weeks 1 through week N for each day of the week.

In another embodiment, the table may further include various workout regimens 306 that the user plans to complete for weeks 1 through week N for each day of the week. In one embodiment, each workout regimen may include various physical exercises and a number of physical exercises which can be accessible from one or more templates. In one example, on Monday, week 2, the user 102 plans to consume 1732 calories and plans to perform workout 5. In some embodiments, when submits a request to predict a change in physique of the body of the user, the user may include the caloric consumption 304 and the workout regimens 306 as the input parameters. Using the noted inputs parameters, the system may use a model to generate an augmented image of the body of the user that is responsive to the request made by the user.

FIG. 4 is an embodiment of a total body composition summary 402 of a user 102. In some embodiments, the total body composition summary 402 may include one or more metrics 404 that correspond to various body regions 406 of the user 102 and totals 408. For example, in one embodiment, the one or more metrics 404 may include fat percentage at a specific body region, total mass at a specific body region, fat mass at a specific body region, lean muscle mass at a specific body region, and the bone mineral content at a specific body region. In some embodiments, the total body composition summary 402 can be used to determine the amount of body fat and muscle mass that is located at each body region. Using the total body composition summary 402, a user may design their workout regimens so that they can achieve a desired physique or specific fitness goals. For example, a user 102 who does not like how their chest and arms look because they are carrying too much body fat and not enough muscle in those regions. Accordingly, the user can alter their workout regimens and their caloric consumption so that the user can build muscle and lose fat along their chest and arm regions.

In other embodiments, the total body composition summary 402 can be used to track the progress of the user when working towards a desired physique. For example, a user that is preparing for a bodybuilding competition may want to aim to have a total body fat percentage below a specific threshold and the total body composition summary 402 can be used to provide the user with updates as the user progresses along their preparation for the bodybuilding competition. In some embodiments, the total body composition summary 402 can be used to determine a resting metabolic rate (RMR) of the user. In one embodiment, the RMR of the user provides the system with the rate at which a body of a user burns energy when it is at complete rest. In one embodiment, the RMR is one factor that can be used in determining the change in physique of a user at a specific point in the future.

Figure 5:
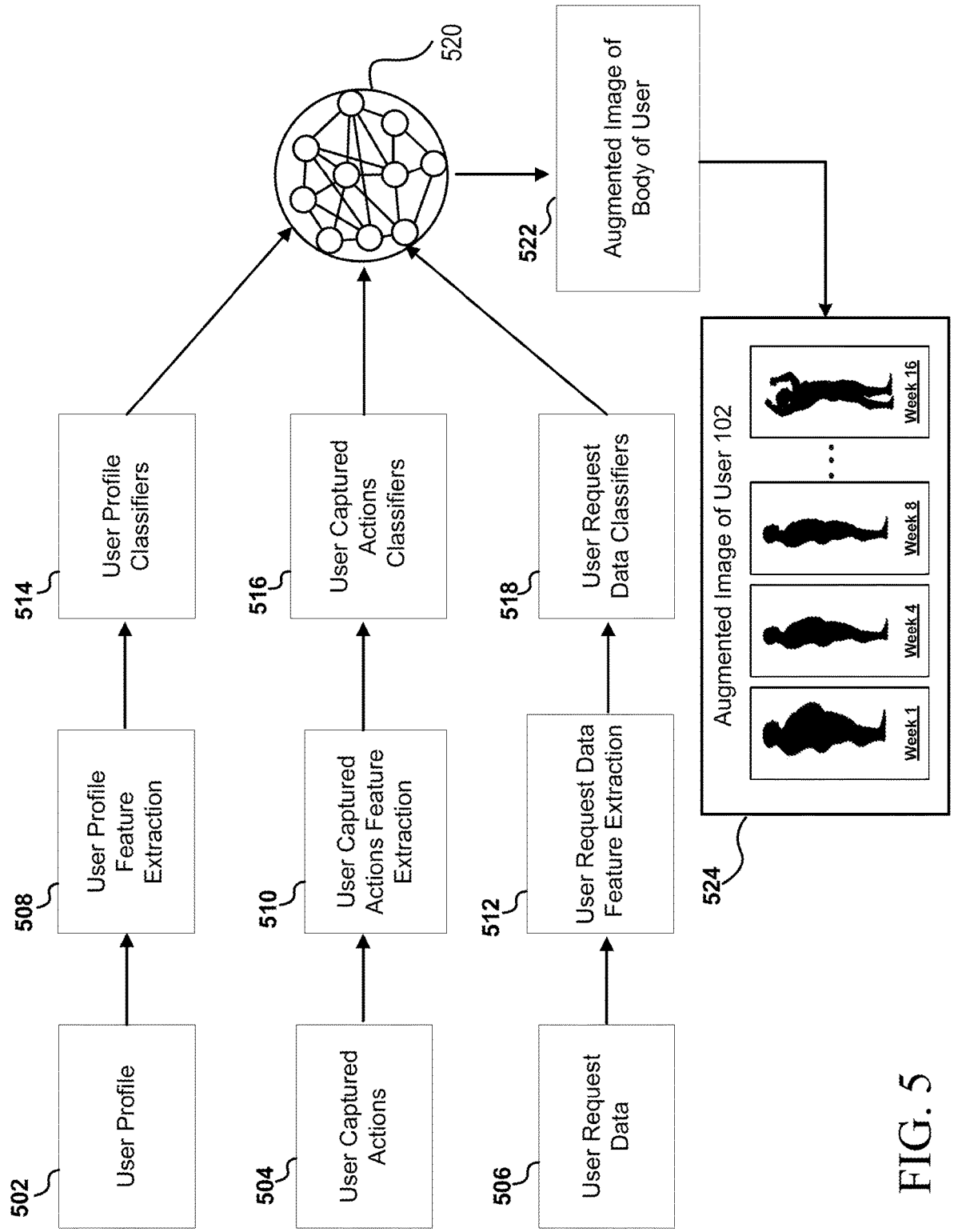
FIG. 5 illustrates an embodiment of a method for using a model to dynamically generate an augmented image of the body of a user for presenting on a mirror display using a user profile, user captured actions, and user request data as inputs, in accordance with an implementation of the disclosure.

FIG. 5 illustrates an embodiment of a method for using a model 520 to dynamically generate an augmented image of the body of a user 102 for presenting on a mirror display 104 using a user profile 502, user captured actions 504, and user request data 506 as inputs. As noted above, the generated augmented image of the body of the user may include a change in change in physique of the user. Generally, some users may not be as motivated as others to continue adhering to their workout and diet routine when the results are not evident and are their progression is unnoticeable on a day-by-day basis. When a user is provided with an augmented image of what their physique may look like in the future, the user may be encouraged to stay on track and continue working toward their fitness goals. In this way, this facilitates an enhanced and improved way of helping users achieve their fitness goals since users may feel like they are progressing and their dedication to working out will pay off.

As shown in FIG. 5, in one embodiment, the system may include feature extraction operations (e.g., 508, 510, 512) that are configured to identify various features in the user profile 502, the user captured actions 504, and the user request data 506. After the feature extraction operations identifies the features associated with the inputs, classifier operations (e.g., 514, 516, 518) may be configured to classify the features using one or more classifiers. In some embodiments, the system includes a model 520 of the user that is configured to receive the classified features from the classifier operations. Using the classified features, the model 520 can be used to generate an augmented image of the body of the user where the augmented image includes a change in physique of the body of the user. In some embodiments, operation 522 can use the model 520 to determine and select the 3D models of the body parts of the user and its corresponding adjusted shapes and sizes that are used for assembling the change in physique of the body of the user. In one embodiment, at operation 524, the mirror display 104 is configured to receive the augmented image which can be presented on the mirror display 104 and viewed by the user.

In one embodiment, the system can process the user profile 502. In some embodiments, the user profile 502 may include various attributes and information associated with user 102 such as the height, weight, body composition, resting metabolic rate (RMR), physiological measurements (e.g., heart rate, blood pressure, oxygen saturation, respiration, body temperature, etc.), health history, injuries, etc. In some embodiments, the user profile feature extraction 508 operation is configured to process the user profile 502 to identify and extract features associated with the profile of the user 102. After the user profile feature extraction 508 operation processes and identifies the features from the user profile 502, the user profile classifiers 514 operation is configured to classify the features using one or more classifiers. In one embodiment, the features are labeled using a classification algorithm for further refining by the model 520.

In another embodiment, the system can process the user captured actions 504. In some embodiments, the user captured actions 504 may include all the actions performed by the user 102 such as the type of physical exercise, repetition of physical exercise, intensity of physical exercise, weights used to perform the physical exercise, type of food and diet consumed by the user, calories consumed by the user, vitamins and supplements consumed, nutrition associated with the diet of the user, etc. In other embodiments, the user captured actions 504 may include non-actions of the user such as the user missing certain physical exercises, methods, routines, days, meals, vitamins, supplements, etc. As noted above, while the user is in the activity volume 124, the movements, actions, and non-actions of the user can be tracked by the system. When the user performs a specific exercise routine, the system can use machine learning to determine the type of exercise performed (e.g., jogging, jumping jacks, squats, push-ups, crunches, etc.), the number of repetitions performed, and the calories that the user burns from performing the exercises.

In some embodiments, the user captured actions feature extraction 510 operation is configured to process the user captured actions 504 to identify and extract features associated with the user captured actions of the user. After the user captured actions feature extraction 510 operation processes and identifies the features from the user captured actions 504, the user captured actions classifiers 516 operation is configured to classify the features using one or more classifiers. In one embodiment, the features are labeled using a classification algorithm for further refining by the model 520.

In another embodiment, the system can process the user request data 506. In one embodiment, the user request data 506 may include information related to the request made by the user to predict a change in physique such as various input parameters. For example, the user request data 506 may include a specific request inquiry such as a request of what the physique of the user or specific body part of the user may look like at future specified date. The user request data 506 may include input parameters such as type of exercises, volume of exercises, intensity of exercises, dietary type, caloric consumption, macronutrients, micronutrients, etc. For example, a user 102 may be on a physical fitness plan and wants to make some changes to their dietary plan that includes a change from a ketogenic diet to a paleo diet. Using an input touchscreen on the mirror display, the user submits a request to predict a change in physique that includes input parameters that identifies a future target diet (e.g., 2 weeks from current date), and a paleo diet instead of a ketogenic diet. Based on the updated input parameters, the system may generate an augmented image of what the physique of the user may look like in 2 weeks if the user adheres to a paleo diet while maintaining the same physical activity regimen.

In some embodiments, the user request data feature extraction 512 operation is configured to process the user request data 506 to identify and extract features associated with the user request data. After the user request data feature extraction 512 processes and identifies the features from the user request data 506, the user request data classifiers 518 operation is configured to classify the features using one or more classifiers. In some embodiments, the features are labeled using a classification algorithm for further refining by the model 520.

In some embodiments, the model 520 is configured to receive as inputs the classified features (e.g., user profile classified features, user captured actions classified features, user request data classified features). In another embodiment, other inputs that are not direct inputs or lack of input/feedback, may also be taken as inputs to the model 520. The model 520 may use a machine learning model which can be used to generate the augmented image of the body of the user by identifying and selecting 3D models of the body parts of the user that are used for assembling the change in physique of the user. In other embodiments, the model 520 can receive as input feedback data such as data related to updates to the user captured actions (e.g., changes to intensity and amount of physical exercise of user) and updates to user request data.

To illustrates the use of the model 520, in one example, a user profile 502 associated with a user may include a current body composition report that indicates that the user 102 weights 276 lbs. and has a body fat percentage of 35%. While performing various exercises in front of the mirror display 104 in the activity volume 124, the system is configured to track the movements of the user and implement a machine learning algorithm to determine the type of exercises that the user is performing, e.g., burpees, squats, push-ups, sit-ups, etc. The various exercises and actions by the user are captured and included in the user captured actions 504 for processing by the system. After or during the exercise session, the user may submit a request to predict what the user's physique may look like in four weeks if the user continues with the same exercise routine. Using the user profile 502, the user captured actions 504, and user request data 506 as inputs, the model 520 can be used to generate an augmented image of the physique of the user where the user would weigh 225 lbs. and have body fat percentage of 28% in four weeks. In other embodiments, the augmented image of the user's physique can be provided to the user during the user's exercise session as feedback without a request being submitted by the user. In this way, during the exercise session of the user, the user will be encouraged and motivated to continue working out until the workout session is complete.

In some embodiments, operation 522 can use the model 520 to determine the type of adjustments to make to present image of the body of the user for generating an augmented image of the body of the user. In one embodiment, operation 522 can use the model 520 to generate a mesh outline of various body parts of the user and to adjust the shape of the mesh outline to generate corresponding 3D models for the various body parts. In some embodiments, the shape of the mesh outline is identified from various templates where each template corresponds to a specific body part, the physical exercise, and the amount of the physical exercise. For example, a template may correspond to the entire body of the user and jumping jacks exercise that are performed for 20 minutes. The use of the template for the jumping jacks exercise may decrease the shape of the mesh outline of all the body parts of the user by a magnitude relative to its corresponding initial shape since the jumping jacks may result in the user losing weight throughout the entire body of the user. In another example, a template may correspond to chest and arms of the user where bench press exercises which are performed at high repetition counts until failure. The use of the template may increase the shape of the mesh outline for the chest and arms of the user by a magnitude relative to its corresponding initial shape since the increase in shape represents an increase in muscle mass in the user's chest and arms.

In other embodiments, operation 522 can use the model 520 to identify and select 3D models of the body parts of the user that are used for assembling the change in physique of the user. For example, based on the user captured actions 504, the system may determine that the user does primarily performs exercises that targets the user's legs. Accordingly, operation 522 may select 3D models that corresponds to the legs of the user that have been adjusted in shape to show greater muscle definition and lean muscle mass for assembling the physique of the user.

After operation 522 generates the augmented image of the body of the user, operation 524 is configured to present the augmented image on the mirror display. In one embodiment, the augmented image is presented as a video overlay over images of the user captured when the user is in the activity volume. In one embodiment, the presented augmented image is responsive to a user's request to predict the change in physique of the user. In some embodiments, operation 524 is configured to present a notification message for display on the mirror display. In one example, the notification message one or more metrics (e.g., Week 16: 188 lbs., 15% body fat) associated with the generated augmented image of the user.

Figure 6:
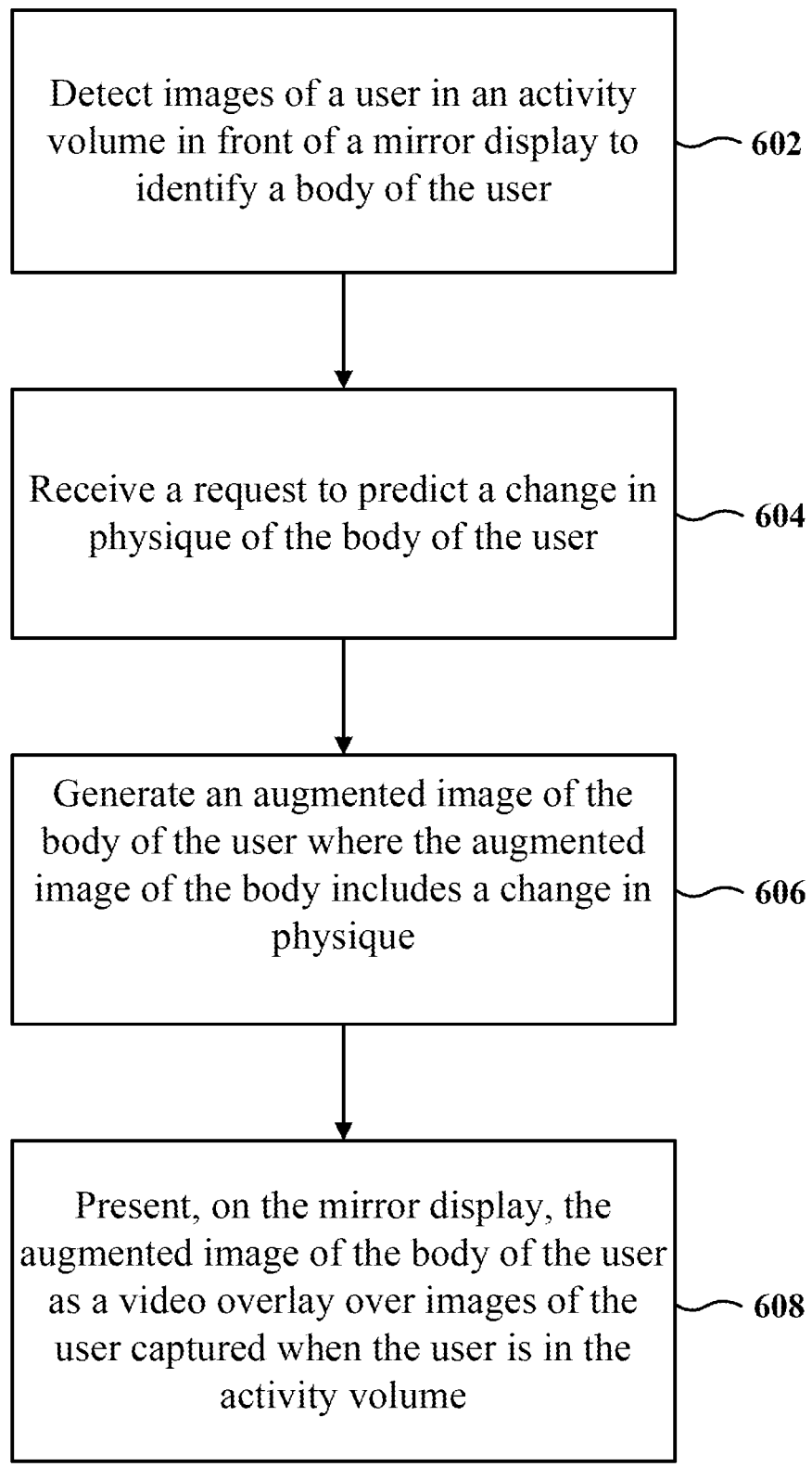
FIG. 6 illustrates a method for generating an augmented image of the body of the user for presenting on a mirror display, in accordance with an implementation of the disclosure.

FIG. 6 illustrates a method for generating an augmented image of the body of the user for presenting on a mirror display 104. In one embodiment, the method described in FIG. 6 can be used to encourage a user to continue with their physical activity regimen and dietary plan so that they can achieve their fitness goals. In this way, when a user is provided with an augmented image of what their physique may look like in the future, the user may be inspired to adhere to their fitness regimen because they visualize what their physique may look like in the future.

In one embodiment, the method includes an operation 602 that is configured to detect images of a user 102 in an activity volume 124 in front of a mirror display 104 to identify a body of the user. For example, a user may be standing in the activity volume 124 in front of the mirror display 104 watching an instructor-led video stream that guides the user through a series of exercise movements. While viewing the video stream on the display mirror, operation 602 is configured to identify the body of the user and track the movements of the user while user performs the exercise movements. In one embodiment, the movements of the user are tracked and captured as video frames which may allow the system to track each body part of the user.

The method shown in FIG. 6 then flows to operation 604 where the operation is configured to receive a request to predict a change in physique of the body of the user. In some embodiments, the request includes input parameters that identify a physical exercise and an amount of the physical exercise. In other embodiments, the request includes input parameters that identify dietary type, caloric consumption, macronutrient consumption, micronutrient consumption, water consumption, vitamins, supplements, etc. In some embodiments, operation 604 is configured to receive the request to predict via natural language (e.g., voice output) of the user 102. In one example, the user may stand in front of the mirror display and verbally express the request to predict, "Hey Sony, how will my physique look in 2 weeks if I keep doing yoga classes every day?" In other embodiments, operation 604 is configured to receive the request to predict via an input menu screen on the mirror display 104.

The method flows to operation 606 where the operation is configured to generate an augmented image of the body of the user where the augmented image of the body includes a change in physique of the user. In some embodiments, the change in physique of the body is assembled from 3D models of the body parts of the user that that have been adjusted in shape and size. In one embodiment, the 3D models of the body parts can be produced by generating a mesh outline of the body parts where the mesh outline of the body parts is adjusted in shape and size to produce the 3D models. For example, the system may increase or decrease the shape of the mesh outline by a magnitude relative to the initial shape of the body parts. In some embodiments, the assembling of the 3D models to produce the physique of the user blends together the 3D models causing adjoining 3D models to appear dynamically integrated along a boundary between the adjoining 3D models. For example, when blended together, the physique appears continuous and unified.

In some embodiments, depending on the speed of the user's exercise being performed in front of the mirror display 104, the blending process can be granularly adjusted. For example, the motions are very fast, the blending process may be coarser. If the motions of the user are slower, the blending process may be more fine, i.e., with higher fidelity. By way of example, during a workout routine, the blending of graphic overlays can be dynamically adjusted to be coarse or fine, based on the movement being tracked at the time. In some configurations, the blending of overlays for the augmentation can be periodically applied when the user stops or reduces movements.

The method flows to operation 608 where the operation is configured to present, on the mirror display 104, the augmented image of the body of the user as a video overlay over images of the user captured when the user is in the activity volume 124. In some embodiments, the presenting of the augmented image is responsive to processing the request to predict the change in physique of the body of the user. In one embodiment, the video overlay dynamically moves along with the images of the user when the user moves in the activity volume. For example, the video overlay may include the abdominals of the user where the abdominals have a reduced body fat percentage with greater muscle definition. As the user moves and changes their position to view their abdominals from different angles, the video overlay of the abdominals can move along with the user. In some embodiments, the video overlay of the abdominals can be dynamically overlaid over the images of the user's present abdominals and under the clothing of the user. For example, the video overlay of the abdominals is not exposed if the user is wearing a shirt. However, if the user takes of their shirt, the video overlay of the abdominals is exposed to the user and others viewing the mirror display 104.

In general, the above-described methods enable augmenting of images of users viewing themselves in a display mirror, using augmented reality. In one embodiment, a user may stand in front of the mirror display that can augment the users shape, fitness, look, or other attributes. This augmentation of the user's image can be done in real time using templates, machine learning to identify best fit scenarios, and partial adjustments to different parts of the body or attributes of the body. In one embodiment, the fitness mirror is provided, which allows the user to project what the user can look like after a certain routine for fitness is performed for a period of time. For example, the user can be looking into the mirror and ask how the user will look in 3 weeks if the user continues to do a specific exercise. The fitness mirror will then automatically augment the user's physique to show the user how certain exercises will impact different body parts. In one embodiment, the fitness mirror can be provided dynamic feedback during a workout, showing where fitness results will occur if the user continues to do a certain exercise.

In other embodiments, the fitness mirror can be designed to augment it's the users physique to add weight, if the user continues to miss exercise days or fails to exercise. For example, the augmenting of the user's physique can dynamically make the user look heavier, and the system can provide feedback warning the user of the look the user will take on if certain exercising routines, methods, or days are missed. The user looking at him or herself in a mirror will see the potential for weight gain already on the user, thus encouraging the user to continue to work out.

Figure 7:
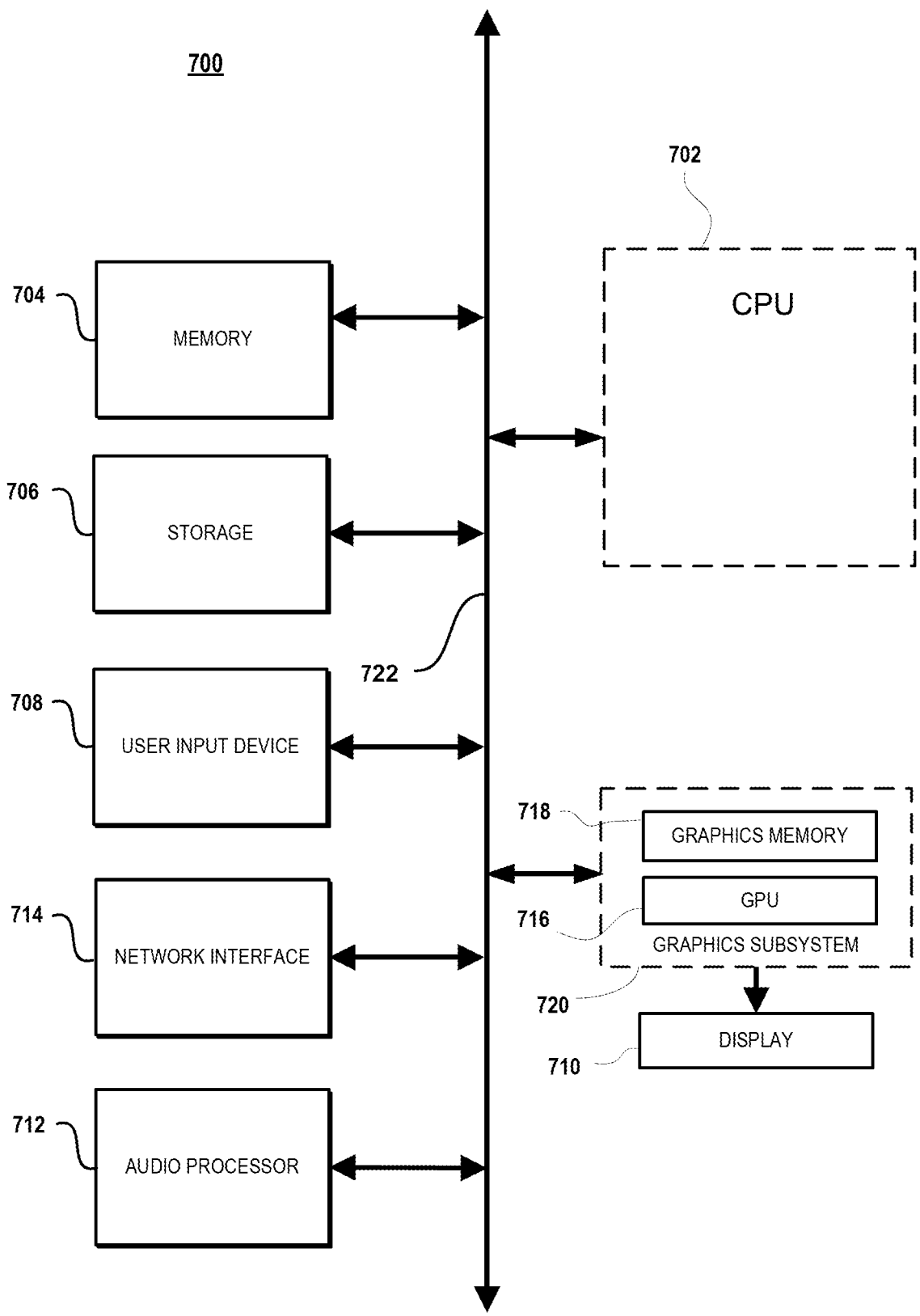
FIG. 7 illustrates components of an example device that can be used to perform aspects of the various embodiments of the present disclosure.

FIG. 7 illustrates components of an example device 700 that can be used to perform aspects of the various embodiments of the present disclosure. This block diagram illustrates a device 700 that can incorporate or can be a personal computer, video game console, personal digital assistant, a server or other digital device, suitable for practicing an embodiment of the disclosure. Device 700 includes a central processing unit (CPU) 702 for running software applications and optionally an operating system. CPU 702 may be comprised of one or more homogeneous or heterogeneous processing cores. For example, CPU 702 is one or more general-purpose microprocessors having one or more processing cores. Further embodiments can be implemented using one or more CPUs with microprocessor architectures specifically adapted for highly parallel and computationally intensive applications, such as processing operations of interpreting a query, identifying contextually relevant resources, and implementing and rendering the contextually relevant resources in a video game immediately. Device 700 may be a localized to a player playing a game segment (e.g., game console), or remote from the player (e.g., back-end server processor), or one of many servers using virtualization in a game cloud system for remote streaming of gameplay to clients.

Memory 704 stores applications and data for use by the CPU 702. Storage 706 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 708 communicate user inputs from one or more users to device 700, examples of which may include keyboards, mice, joysticks, touch pads, touch screens, still or video recorders/cameras, tracking devices for recognizing gestures, and/or microphones. Network interface 714 allows device 700 to communicate with other computer systems via an electronic communications network, and may include wired or wireless communication over local area networks and wide area networks such as the internet. An audio processor 712 is adapted to generate analog or digital audio output from instructions and/or data provided by the CPU 702, memory 704, and/or storage 706. The components of device 700, including CPU 702, memory 704, data storage 706, user input devices 708, network interface 710, and audio processor 712 are connected via one or more data buses 722.

A graphics subsystem 720 is further connected with data bus 722 and the components of the device 700. The graphics subsystem 720 includes a graphics processing unit (GPU) 716 and graphics memory 718. Graphics memory 718 includes a display memory (e.g., a frame buffer) used for storing pixel data for each pixel of an output image. Graphics memory 718 can be integrated in the same device as GPU 708, connected as a separate device with GPU 716, and/or implemented within memory 704. Pixel data can be provided to graphics memory 718 directly from the CPU 702. Alternatively, CPU 702 provides the GPU 716 with data and/or instructions defining the desired output images, from which the GPU 716 generates the pixel data of one or more output images. The data and/or instructions defining the desired output images can be stored in memory 704 and/or graphics memory 718. In an embodiment, the GPU 716 includes 3D rendering capabilities for generating pixel data for output images from instructions and data defining the geometry, lighting, shading, texturing, motion, and/or camera parameters for a scene. The GPU 716 can further include one or more programmable execution units capable of executing shader programs.

The graphics subsystem 714 periodically outputs pixel data for an image from graphics memory 718 to be displayed on display device 710. Display device 710 can be any device capable of displaying visual information in response to a signal from the device 700, including CRT, LCD, plasma, and OLED displays. Device 700 can provide the display device 710 with an analog or digital signal, for example.

It should be noted that, access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A game server may be used to perform the operations of the durational information platform for video game players, in some embodiments. Most video games played over the Internet operate via a connection to the game server. Typically, games use a dedicated server application that collects data from players and distributes it to other players. In other embodiments, the video game may be executed by a distributed game engine. In these embodiments, the distributed game engine may be executed on a plurality of processing entities (PEs) such that each PE executes a functional segment of a given game engine that the video game runs on. Each processing entity is seen by the game engine as simply a compute node. Game engines typically perform an array of functionally diverse operations to execute a video game application along with additional services that a user experiences. For example, game engines implement game logic, perform game calculations, physics, geometry transformations, rendering, lighting, shading, audio, as well as additional in-game or game-related services. Additional services may include, for example, messaging, social utilities, audio communication, game play replay functions, help function, etc. While game engines may sometimes be executed on an operating system virtualized by a hypervisor of a particular server, in other embodiments, the game engine itself is distributed among a plurality of processing entities, each of which may reside on different server units of a data center.

According to this embodiment, the respective processing entities for performing the may be a server unit, a virtual machine, or a container, depending on the needs of each game engine segment. For example, if a game engine segment is responsible for camera transformations, that particular game engine segment may be provisioned with a virtual machine associated with a graphics processing unit (GPU) since it will be doing a large number of relatively simple mathematical operations (e.g., matrix transformations). Other game engine segments that require fewer but more complex operations may be provisioned with a processing entity associated with one or more higher power central processing units (CPUs).

By distributing the game engine, the game engine is provided with elastic computing properties that are not bound by the capabilities of a physical server unit. Instead, the game engine, when needed, is provisioned with more or fewer compute nodes to meet the demands of the video game. From the perspective of the video game and a video game player, the game engine being distributed across multiple compute nodes is indistinguishable from a non-distributed game engine executed on a single processing entity, because a game engine manager or supervisor distributes the workload and integrates the results seamlessly to provide video game output components for the end user.

Users access the remote services with client devices, which include at least a CPU, a display and I/O. The client device can be a PC, a mobile phone, a netbook, a PDA, etc. In one embodiment, the network executing on the game server recognizes the type of device used by the client and adjusts the communication method employed. In other cases, client devices use a standard communications method, such as html, to access the application on the game server over the internet.

It should be appreciated that a given video game or gaming application may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g., prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g., accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g., accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g., feedback data) from the client device or directly from the cloud gaming server.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processing of the telemetry and game state data for generating modified game states and are performed in the desired way.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

In one embodiment, the video game is executed either locally on a gaming machine, a personal computer, or on a server. In some cases, the video game is executed by one or more servers of a data center. When the video game is executed, some instances of the video game may be a simulation of the video game. For example, the video game may be executed by an environment or server that generates a simulation of the video game. The simulation, on some embodiments, is an instance of the video game. In other embodiments, the simulation maybe produced by an emulator. In either case, if the video game is represented as a simulation, that simulation is capable of being executed to render interactive content that can be interactively streamed, executed, and/or controlled by user input.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A method for augmenting image content presented on a mirror display, comprising:
   detecting images of a user in an activity volume in front of the mirror display, the detecting includes identifying a body of the user and tracking movements by the user while in the activity volume;
   receiving a request to predict a change in physique of the body of the user, the request includes input parameters that identify a physical exercise and an amount of said physical exercise;
   generating an augmented image of the body of the user, the augmented image of the body has said change in physique, the change in physique of the body is assembled from one or more three-dimensional (3D) models of one or more body parts of the body that have been adjusted in shape; and
   presenting, on the mirror display, the augmented image of the body of the user as a video overlay over images of the user captured when the user is in the activity volume, the presenting is responsive to processing said request to predict the change in physique of the body of the user;
   wherein the assembling of the change in physique of the body blends together the one or more 3D models causing adjoining 3D models to appear dynamically integrated along a boundary between the adjoining 3D models.

2. The method of claim 1, further comprising:
   processing images of the body of the user while in the activity volume, the processing includes generating a mesh outline of one or more body parts of the user and adjusting a shape of the mesh outline to generate the one or more 3D models of said one or more body parts.

3. The method of claim 2, wherein the shape of the mesh outline is increased or decreased by a magnitude relative to a corresponding initial shape of said one or more body parts of the user.

4. The method of claim 2, wherein the shape of the mesh outline is identified from one or more templates, said one or more templates corresponds to the one or more body parts of the user, the physical exercise and the amount of said physical exercise.

5. The method of claim 1, wherein the video overlay dynamically moves along with the captured images of the user when the user moves in the activity volume.

6. The method of claim 1, wherein the input parameters further identify calories consumed, dietary type, macronutrients, micronutrients, or a combination of two or more thereof.

7. The method of claim 1, wherein the request to predict is submitted by natural language of the user and processed to identify the input parameters associated with said request predict.

8. The method of claim 1, further comprising:
   generating a notification icon for presenting on the mirror display, said notification icon is selectable for displaying a notification message to provide a feedback warning associated with the change in physique of the body of the user.

9. The method of claim 1, further comprising:
   generating a notification message for presenting on the mirror display, said notification message includes one or more metrics associated with the augmented image of the body of the user.

10. The method of claim 1, wherein the presenting on the mirror display further includes media content, said media content includes video corresponding to the physical exercise of the user.

11. The method of claim 1, wherein the presenting on the mirror display further includes generated dynamic feedback that is presented to the user while tracking the movements of the user while in the activity volume, said generated dynamic feedback includes information associated with the change in physique of the user.

12. A method for augmenting image content presented on a mirror display, comprising:
   detecting images of a user in an activity volume in front of the mirror display, the detecting includes identifying a body of the user and tracking movements by the user while in the activity volume;
   receiving a request to predict a change in physique of the body of the user, the request includes input parameters that identify a physical exercise and an amount of said physical exercise;
   generating an augmented image of the body of the user, the augmented image of the body has said change in physique, the change in physique of the body is assembled from one or more three-dimensional (3D) models of one or more body parts of the body that have been adjusted in shape; and presenting, on the mirror display, the augmented image of the body of the user as a video overlay over images of the user captured when the user is in the activity volume, the presenting is responsive to processing said request to predict the change in physique of the body of the user;

wherein generating the augmented image of the body of the user further includes processing a profile of the user, captured actions of the user, and request data of the user through model of the user, the model configured to identify features from the profile of the user, the captured actions of the user, and the request data to classify attributes of the user, the attributes of the user being used to select the one or more 3D models to assemble the change in physique of the body of the user.

13. A method for augmenting image content presented on a mirror display, comprising:

capturing images of an activity volume disposed proximate to a front of the mirror display;

detecting a user in the activity volume, the detecting includes identifying a body of the user and tracking movements by the user while in the activity volume;

receiving a request to predict a change in physique of the body of the user, the request includes input parameters that identify a physical exercise and an amount of said physical exercise;

processing images of the body of the user while in the activity volume, the processing includes generating a mesh outline of one or more body parts of the user and adjusting a shape of the mesh outline to generate three-dimensional (3D) models of said body parts; and generating an augmented image of the body of the user, the augmented image of the body has said change in physique, the change in physique of the body is assembled from one or more 3D models of said body parts that have been adjusted in shape;

wherein the augmented image of the body of the user is presented as a video overlay over images of the user captured when the user is in the activity volume, the presenting is on the mirror display;

wherein the shape of the mesh outline is increased or decreased by a magnitude relative to a corresponding initial shape of said one or more body parts of the user.

14. The method of claim 13, wherein the assembling of the change in physique of the body blends together the one or more 3D models causing adjoining 3D models to appear dynamically integrated along a boundary between the adjoining 3D models.

15. The method of claim 13, wherein the input parameters further identify calories consumed, dietary type, macronutrients, micronutrients, or a combination of two or more thereof.

16. The method of claim 13, further comprising:

generating a notification icon for presenting on the mirror display, said notification icon is selectable for displaying a notification message to provide a feedback warning associated with the change in physique of the body of the user.

17. The method of claim 13, wherein generating the augmented image of the body of the user further includes processing a profile of the user, captured actions of the user, and request to predict data of the user through model of the user, the model configured to identify features from the profile of the user, the captured actions of the user, and the request to predict data to classify attributes of the user, the attributes of the user being used to select the one or more 3D models to assemble the change in physique of the body of the user.

18. A method for augmenting image content presented on a mirror display, comprising:

capturing images of an activity volume disposed proximate to a front of the mirror display;

detecting a user in the activity volume, the detecting includes identifying a body of the user and tracking movements by the user while in the activity volume;

receiving a request to predict a change in physique of the body of the user, the request includes input parameters that identify a physical exercise and an amount of said physical exercise;

processing images of the body of the user while in the activity volume, the processing includes generating a mesh outline of one or more body parts of the user and adjusting a shape of the mesh outline to generate three-dimensional (3D) models of said body parts; and generating an augmented image of the body of the user, the augmented image of the body has said change in physique, the change in physique of the body is assembled from one or more 3D models of said body parts that have been adjusted in shape;

wherein the augmented image of the body of the user is presented as a video overlay over images of the user captured when the user is in the activity volume, the presenting is on the mirror display;

wherein the shape of the mesh outline is identified from one or more templates, said one or more templates corresponds to the one or more body parts of the user, the physical exercise and the amount of said physical exercise.

* * * * *